US010616315B2

(12) United States Patent
Armstrong et al.

(10) Patent No.: US 10,616,315 B2
(45) Date of Patent: Apr. 7, 2020

(54) LOAD BALANCING SYSTEM

(71) Applicant: INTERNATIONAL BUSINESS MACHINES CORPORATION, Armonk, NY (US)

(72) Inventors: Andrew A. Armstrong, Hursley (GB); Christopher Phillips, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 15/214,898

(22) Filed: Jul. 20, 2016

(65) Prior Publication Data

US 2018/0027056 A1  Jan. 25, 2018

(51) Int. Cl.
G06F 15/173 (2006.01)
H04L 29/08 (2006.01)
H04L 29/06 (2006.01)
H04L 12/803 (2013.01)

(52) U.S. Cl.
CPC .......... *H04L 67/1008* (2013.01); *H04L 69/24* (2013.01); *H04L 47/125* (2013.01)

(58) Field of Classification Search
CPC ..... H04L 67/1008; H04L 45/22; H04L 69/28; H04L 69/24; H04L 47/125
USPC ........................................................ 709/226
See application file for complete search history.

(56) References Cited

U.S. PATENT DOCUMENTS

| 7,020,697 | B1* | 3/2006 | Goodman | G06Q 10/06 709/223 |
| 7,203,747 | B2 | 4/2007 | Bhat et al. | |
| 7,437,342 | B2 | 10/2008 | Khandekar | |
| 7,719,974 | B2 | 5/2010 | Chandwadkar et al. | |
| 8,156,388 | B2* | 4/2012 | Herrod | G06F 11/0742 714/25 |
| 8,762,427 | B2* | 6/2014 | Gershfang | G06Q 10/10 705/7.38 |
| 8,849,976 | B2 | 9/2014 | Thibeault | |
| 8,997,088 | B2 | 3/2015 | Gurikar et al. | |
| 9,318,003 | B2 | 4/2016 | Nilsson et al. | |
| 9,436,583 | B1* | 9/2016 | Chen | G06F 11/3636 |
| 9,825,881 | B2* | 11/2017 | Johnston | H04L 47/827 |

(Continued)

FOREIGN PATENT DOCUMENTS

WO    WO 2014/100244 A1    6/2014

OTHER PUBLICATIONS

"Application Request Routing", The Official Microsoft IIS Site, http://www.iis.net/downloads/microsoft/application-request-routing, downloaded Feb. 16, 2016 (3 pages).

(Continued)

*Primary Examiner* — Kristie D Shingles

(74) *Attorney, Agent, or Firm* — William Kinnaman; Matthew M. Hulihan; Heslin Rothenberg Farley & Mesiti PC

(57) ABSTRACT

Populating a routing dataset for a load balancing system with service capability data is provided. The approach includes requesting a production environment to perform a service. Based on the production environment indicating that it does not have the capability of performing the requested service, the method includes storing data in a routing dataset, the data including an indicator indicating that the production environment is incapable of performing the service.

17 Claims, 4 Drawing Sheets

(56) References Cited

U.S. PATENT DOCUMENTS

| | | | | |
|---|---|---|---|---|
| 9,953,054 B2* | 4/2018 | Collins | ............... | G06F 16/2453 |
| 10,104,169 B1* | 10/2018 | Moniz | ................. | H04L 67/1017 |
| 10,235,252 B1* | 3/2019 | Lieberman | .......... | G06F 11/1469 |
| 10,289,539 B1* | 5/2019 | Arguelles | ............ | G06F 11/3692 |
| 2006/0059253 A1* | 3/2006 | Goodman | .............. | G06Q 10/06 |
| | | | | 709/223 |
| 2014/0365198 A1* | 12/2014 | Kuell | .................. | G06F 17/5009 |
| | | | | 703/17 |
| 2015/0350974 A1 | 12/2015 | Patil et al. | | |
| 2016/0342499 A1* | 11/2016 | Cheng | ................. | G06F 11/3644 |
| 2017/0134260 A1* | 5/2017 | Davidson | ................ | H04L 45/22 |

OTHER PUBLICATIONS

"Intelligent Load Balancing", http://help/fortinet.com/coyotepoint/10-3-2/Content/Equalizer_Overview/ . . . , downloaded Feb. 16, 2016 (2 pages).
List of IBM Patents or Applications Treated as Related, Dec. 6, 2019, 2 pgs.
"Load Balancing System", U.S. Appl. No. 16/585,573, filed Sep. 27, 2019, pp. 1-38).

\* cited by examiner

LOAD BALANCING SYSTEM

BACKGROUND

The present invention relates to the field of load balancing systems and more specifically, to load balancing systems adapted to select, from a plurality of production environments, a production environment to perform a service.

Conventionally, load balancing systems are used in the field of computing to distribute a computational workload across a plurality of processing arrangements or production environments. By way of example only, a plurality of such processing arrangements or production environments may be embodied as a cloud computing network, a computer cluster or even a LAN network. Typically, the load balancing system performs the distribution by receiving a request for a (computational) service to be performed, and selecting a particular processing arrangement (in the plurality of processing arrangements) to perform the requested service. To do so, the load balancing system is usually adapted to identify a current workload of each processing arrangement, and select a processing arrangement based on at least the identified workload (e.g. the processing arrangement having the lowest current workload is selected).

SUMMARY

According to an aspect, there is provided a computer-implemented method of populating a routing dataset for a load balancing system with service capability data, the method including: requesting a first production environment to perform a service; and based on the first production environment indicating that the first production environment is incapable of performing the service: generating service capability data including a first indicator, the first indicator indicating that the first production environment is incapable of performing the service to be performed; and storing the service capability data including the first indicator in the routing dataset so as to populate the routing dataset with at least the first indicator.

According to one or more other aspects, a system is provided for populating a routing dataset for a load balancing system with service capability data. The system includes a memory, and a processor communicatively coupled to the memory. The system performs a method including: requesting a first production environment to perform a service; and based on the first production environment indicating that the first production environment is incapable of performing the service: generating service capability data including a first indicator, the first indicator indicating that the first production environment is incapable of performing the service to be performed; and storing the service capability data including the first indicator in the routing dataset so as to populate the routing dataset with at least the first indicator.

According to a further aspect, there is provided a computer program product for generating service capability data for populating a routing dataset for a load balancing system, the computer program product including a computer readable storage medium having program instructions embodied therewith, the program instructions being executable by a processing unit to cause the processing unit to perform a method including: requesting a first production environment to perform a service; and based on the first production environment indicating that the first production environment is incapable of performing the service: generating service capability data including a first indicator, the first indicator indicating that the first production environment is incapable of performing the service to be performed; and storing the service capability data including the first indicator in the routing dataset so as to populate the routing dataset with at least the first indicator.

Additional features and advantages are realized through the techniques of the present invention. Other embodiments and aspects of the invention are described in detail herein and are considered a part of the claimed invention.

BRIEF DESCRIPTION OF THE DRAWINGS

Certain embodiments of the present invention are described below, by way of example only, with reference to the drawings, in which.

DETAILED DESCRIPTION

Figure 1:
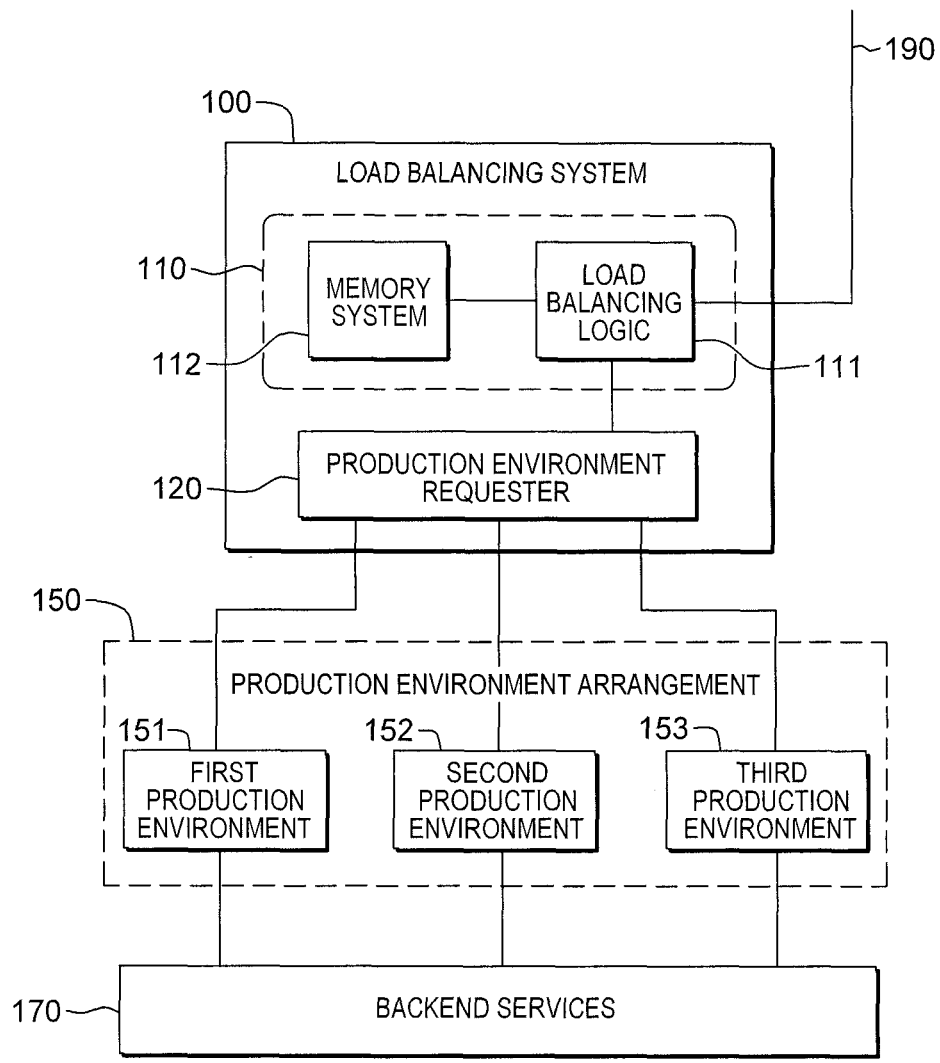
FIG. 1 illustrates a computing network incorporating a load balancing system, in accordance with one or more aspects of the present invention.

It should be understood that the Figures are merely schematic and are not drawn to scale. It should also be understood that the same reference numerals, where used throughout the figures, indicate the same or similar parts.

Disclosed herein are processes, systems, and computer program products for generating service capability data for a load balancing system, the service capability identifying whether a particular production environment is incapable of performing a particular service based on a request for the production environment to perform the service. In this way, a representative routing dataset may be obtained or built, readily identifying the capabilities of production environments associated with the load balancing system.

By generating service capability data in this manner, an automatic determination is made as to whether a production environment is capable of performing or undertaking a desired service. In this way, a routing dataset may be dynamically generated or updated by the method without the need for user intervention to select or identify service capabilities of particular production environments.

One or more embodiments may similarly allow for population of a routing dataset to take place without the need for a user or the load balancing system to explicitly request information (e.g., identifying service capabilities) from the production environments themselves.

One or more embodiments may therefore enable a load balancing system to not require have a pre-cached knowledge of which production environments are capable of performing a method, allowing the load balancing system to act semi-intelligently or autonomously.

Such aspects may provide for the generation of a routing dataset in an automated manner. Any sort of load balancing system could be used with the disclosed invention, but it may be advantageous for such a system to exhibit at least one of the following qualities: request forwarding, request generation, production environment selection, production environment assignation or workload distribution.

Reference to a production environment, as used herein, may be understood as any processing arrangement capable of performing an action in response to a request. Such actions may include, by way of example only, appropriately responding to a request, providing a particular file, running an application or program based on the request or determining an action for a further processing arrangement to perform based on the request. Such production environments may include, for example, a server or cloud computing nodes of a cloud computing network. Other production environments may include, for example, a computer of a computer cluster or a computer of a LAN network.

Reference to a service, as used herein, may be understood to refer to any action which a production environment may perform, such as those exemplified above.

For the sake of understanding the aspects of the present invention, reference to a load balancing system, as used herein, may be understood as a processing arrangement adapted to route, forward or generate requests to/for an appropriate processing arrangement. The load balancing system may, in embodiments, receive a first request and generate a new request for passing to an appropriate production environment. In one or more other embodiments, the load balancing system may select an appropriate production environment (e.g., based on a received request) and route the request directly to the production environment with no or negligible amendments to the request.

Illustrative embodiments may be utilized in many different types of computing or processing networks. In order to provide a context for the description of elements and functionality of the illustrative embodiments, FIGS. 1-5 are provided hereafter as example environments in which aspects of the illustrative embodiments may be implemented. It should be appreciated that such figures are only examples and are not intended to assert or imply any limitation with regard to the environments in which aspects or embodiments of the present invention may be implemented. Many modifications to the depicted environments may be made without departing from the spirit and scope of the present invention.

A method according to an aspect includes requesting a production environment to perform a service. In the event the production environment indicates that it does not have the capability of performing the requested service, the method includes generating data having an indicator indicating that the first production environment cannot perform the requested service and storing the data in a routing dataset.

In other words, the method may include generating a flag indicating or otherwise flagging that a production environment is unable to perform a requested service. In this way, the method may be able to automatically identify a production environment's capabilities to perform the requested or desired service. In one or more embodiments, a production environment identified as being incapable of performing or failing to perform a requested service may be 'blacklisted', such that it is specifically identified.

The production environment may be adapted to explicitly indicate or provide notification that the production environment is unable or incapable of performing the service in response to the request (e.g., through generating an error code or the like). In other embodiments, the indication of the production environment may be implicit, for example, if the production environment has not performed the service within a predetermined time frame (following request of the service), the method may determine that the production environment is indicating that the production environment is incapable of performing the service.

The method includes populating a routing dataset with the data including at least the first indicator. In this way, the routing dataset may be able to indicate whether the first production environment is capable of performing a service. The method may include, for future requests for the service to be performed, taking the stored indicator into account and not attempt requesting the first production environment to perform the service (as it is flagged as not being capable of performing the service).

The routing dataset may, for example, be stored in a memory system. The routing dataset may, in embodiments, be a routing table identifying the service capabilities of at least one production environment to perform a service.

According to one or more aspects, the routing dataset may be updated with new service capabilities data (i.e. old indicator(s) are overwritten) or the routing dataset may be generated using the service capability data (i.e., the first indicator does not overwrite an old indicator stored in the routing table).

In some embodiments, the method includes receiving a request for the service to be performed, and routing this request to the first production environment. In other examples, the method includes receiving a request for the service to be performed, and generating a new request (based on the received request) to be passed to the first production environment.

The computer-implemented method may optionally further include, in response to a predetermined period of time elapsing after storing the service capability data including the first indicator in the routing dataset, removing a portion of the service capability data from the routing dataset, the portion comprising at least the first indicator.

In one or more implementations, the predetermined period of time may be no more than one hour, for example, no more than 30 minutes, for example, no more than 15 minutes.

It may be considered that each indicator has a predetermined time-of-life before being removed or deleted from the routing dataset and/or memory system.

In some embodiments, all data, stored in the routing dataset, corresponding to indicators indicating that any one or more production environments is incapable of performing the service to be performed, may be removed from the routing dataset periodically. In other words, in intervals having a predetermined length of time, data associated with indicators is deleted from the routing dataset.

Removal of the indicator from the routing dataset as described means that in the event a service is deployed to an environment (i.e., the production environment becomes capable of performing a particular service), the method will be able to quickly and automatically detect this additional service capability.

Thus, if a new service or even a new production environment is added, no changes occur to the method, reducing a number of changes to an infrastructure adapted to carry out the method when new services or environments are added.

In some embodiments, the computer implemented method further includes: in response to the first production environment indicating that the first production environment is incapable of performing the service, requesting a second production environment to perform the service.

The computer-implemented method may further include: in response to the second production environment indicating that the second production environment is incapable of performing the service to be performed: generating service capability data including a second indicator, the second indicator indicating that the second production environment is incapable of performing the service to be performed, storing the service capability data including the second indicator in the routing dataset so as to populate the routing dataset with at least the second indicator.

It will be apparent that the method may include consecutively requesting a plurality of production environments to perform a service until a production environment capable of performing the service is reached. Each unsuccessful attempt at requesting a production environment to perform the service may be associated with a generation of a respective indicator (e.g. generation of a first indicator for an unsuccessful request of a first production environment, generation of a second indicator for a unsuccessful request of a second production environment and so on).

The computer implemented method may further include: determining if the routing dataset is storing a first indicator indicating that the first production environment is incapable of performing the service to be performed; and in response to the routing dataset storing the first indicator, requesting the second production environment to perform the service.

Put another way, the method may include consulting the routing dataset in the memory system to determine if the first production environment is capable of performing the service. In the event that the method determines that the first production environment is not capable of performing the service, the method may skip or forego requesting the first production environment to perform the service, and instead request the second production environment to perform the service.

The computer-implemented method optionally further includes, in response to the first production environment indicating that the first production environment is too busy to perform the service, requesting a second production environment to perform the service.

In other words, the method may include determining that the first production environment is capable of performing the service (i.e. has the relevant software or application(s) for undertaking the service), but is currently too busy, overloaded or otherwise congested to perform the service or even that the requester does not have permission to have the service performed. In response to this determination, the method may include requesting that a second production environment perform the service.

It will be apparent that if the first production environment indicates that the first production environment is too busy to perform (rather than incapable of performing) the service, no indicator will typically be generated; rather the method will skip requesting the first production environment to perform the service. In this way, indicators are not mistakenly generated for production environments that are simply busy (rather than incapable).

In at least one embodiment, the computer-implemented method, further includes: receiving a further request for the service to be performed; determining if a routing dataset is storing the first indicator indicating that the first production environment is incapable of performing the service to be performed; and in response to the routing dataset storing the first indicator, requesting a second production environment to perform the service.

There is disclosed a system adapted to populate a routing dataset, the system being adapted to request a production environment to perform a service. In the event the production environment indicates that it does not have the capability of performing the requested service, the system is adapted to generate data having an indicator indicating that the first production environment cannot perform the requested service and store this data in a routing dataset.

The system may be further adapted to receive a request for the service to be performed.

In at least one embodiment, the system is further adapted to, in response to a predetermined period of time elapsing after storing the service capability data comprising the first indicator in the routing dataset, remove a portion of the service capability data from the routing dataset, the portion comprising at least the first indicator.

The system may be adapted to in response to the first production environment indicating that the first production environment is incapable of performing the service, request a second production environment to perform the service.

Optionally, the system is further adapted to, in response to the second production environment indicating that the second production environment is incapable of performing the service to be performed: generate service capability data comprising a second indicator, the second indicator indicating that the second production environment is incapable of performing the service to be performed, and store the service capability data comprising the second indicator in the routing dataset so as to populate the routing dataset with at least the second indicator.

The system may be further adapted to: determine if a routing dataset is storing a first indicator indicating that the first production environment is incapable of performing the service to be performed; and in response to the routing dataset storing the first indicator, request the second production environment to perform the service.

The system is optionally further adapted to in response to the first production environment indicating that the first production environment is too busy to perform the service, request a second production environment to perform the service.

In at least one embodiment, the system is further adapted to: receive a further request for the service to be performed; determine if the routing dataset is storing the first indicator indicating that the first production environment is incapable of performing the service to be performed; and in response to the routing dataset storing the first indicator, request a second production environment to perform the service.

A routing dataset population arrangement is also provided, including: a system as previously described; and a memory system adapted to store a routing dataset. For instance, there is provided a load balancing system including such a routing dataset population arrangement.

In conceivable embodiments, there is provided a computing network including: such a load balancing system; and a plurality of production environments including at least a first production environment and a second production environment.

With reference now to FIG. 1, there is shown a computing network 1, otherwise understood to be a computing system, including a load balancing system 100 (i.e., a load balancer) according to an embodiment. The computing network 1 also includes a production environment arrangement 150, having a plurality of production environments 151, 152, 153, as well as backend services 170. As shown herein, the production arrangement includes a first production environment 151, a second production environment 152 and a third production environment 153.

Each production environment 151, 152, 153 is embodied as a processing arrangement capable of performing at least one service. That is to say, a production environment is capable of undertaking an action (such as generating data or providing a particular file) in response to a request for an appropriate service to be performed. Such a production environment would be readily understood by the person skilled in the art.

The load balancing system 100 acts as a load balancer for the production environment arrangement 150. That is to say, the load balancing system 100 may assign services to different production environments based on, for example, a predetermined method; a known availability of the respective production environments and so on.

In some embodiments, the load balancing system 100 is adapted to determine a service to be performed, select or identify a production environment to perform the service and request the selected production environment to perform the service. Thus, the load balancing system 100 is adapted to identify a desired service, and request a production environment to perform the desired service.

In the present embodiment, the load balancing system 100 includes a production environment requester 120, a memory system 112 and load balancing logic 111.

The production environment requester 120 is adapted to request a selected production environment to perform a service. The load balancing logic 111 is adapted to select which production environment is to be requested to perform the service.

Typically, the load balancing system 100 may receive an external request 190 for a particular service to be performed. The load balancing system may request, via the production environment requester 120, that a production environment perform the particular service based on the external request 190. It will be understood that in some embodiments, the load balancing system 100 may generate a request for a service to be performed, without interaction with external components.

The load balancing logic 111 may select which production environment is to perform the service based at least a routing dataset, which may be stored in the memory system 112. By way of example, the routing dataset may contain service capability data or other information identifying which production environments are capable or incapable of performing a particular service, such that the load balancing logic only selects production environments which are not identified as being incapable of performing the service.

There is proposed a routing dataset population arrangement 110 which, in the present embodiment, includes at least the load balancing logic 111 and the memory system 112.

The routing dataset population arrangement 110 is adapted to populate a routing dataset, on which the load balancing logic may select which production environment is perform a particular service. In typical embodiments, the routing dataset is stored in the memory system 112. The routing dataset may include a table, for example, correlating the production environments (of the production environment arrangement 150) to an ability to perform known service(s).

The load balancing logic 111 is adapted to select a production environment 151, 152, 153 to perform a particular service based on the routing dataset. By way of example, if the routing dataset does not include an indicator indicating that the first production environment 151 is incapable of performing the particular service; the load balancing logic may request that the first production environment 151 perform the service.

In embodiments, the load balancing logic 111 is adapted to select the first available production environment for which the routing dataset does not comprise an indicator indicating that the selected production environment is incapable of performing the desired service.

Figure 2:
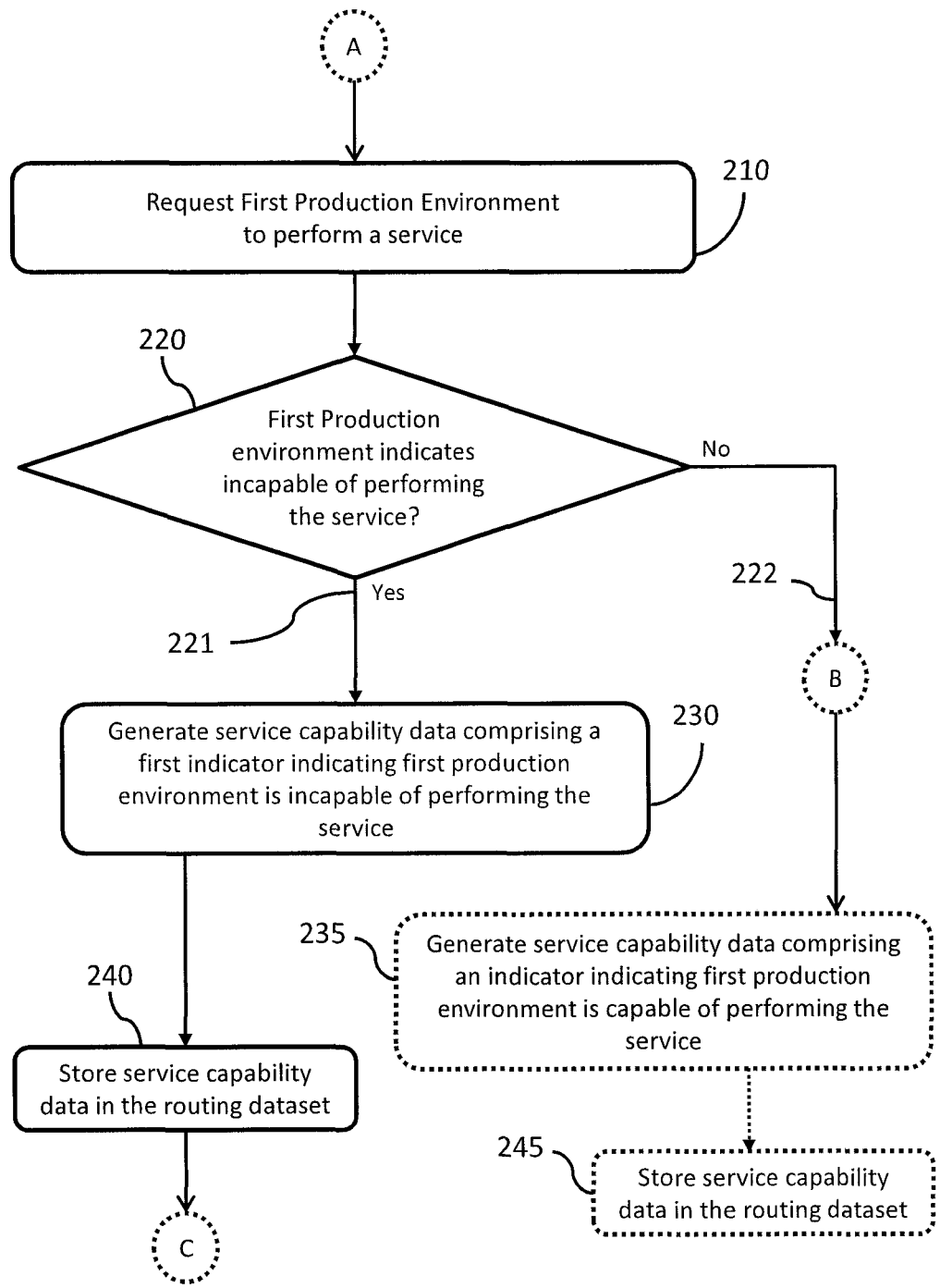
FIG. 2 depicts one embodiment of a process for populating a routing dataset, in accordance with one or more aspects of the present invention.

For the purposes of explanation, in a scenario hereafter described with additional reference to FIGS. 1 & 2, it will be assumed that the routing dataset is unpopulated, such that the routing dataset includes no indicators of the capabilities of production environments. In this scenario, the first production environment 151 is the production environment selected by the load balancing logic to perform the service.

The load balancing logic 111 is adapted to control the production environment request 120 to request 210 the first production environment 151 to perform the desired service.

Upon being requested to perform the desired service, the first production environment may respond 221 to indicate that the first production environment is not capable of performing the service (e.g., a 404 error).

In other words, the load balancing logic 111 is adapted to determine 220 if the first production environment responds indicating that the first production environment is incapable of performing the service.

In response to this indication, the load balancing logic 111 is adapted to generate 230 service capability data including an indicator indicating that the first production environment 151 is not capable of performing the desired service. This indicator is stored 240 in the routing dataset (i.e., in the memory system 112). In other words, the routing dataset is populated with an indicator indicating that the first production environment is incapable of performing the particular service.

The load balancing logic 111 may be further adapted to subsequently request the second production environment 152 to perform the service (i.e., in response to the first production environment 151 indicating that it is not capable of performing the service). In a similar manner, the second production environment 152 may indicate that it is not capable of performing the service, such that the load balancing logic 111 generates a respective indicator indicating that the second production environment is not capable of performing the desired service (to be stored in the routing dataset).

It will be apparent that the load balancing logic 111 may subsequently request a third production environment to perform a service. Thus, the load balancing logic may request any number of subsequent production environments to perform the service until, for example, a production environment indicates that it is capable of performing the service.

In this way, the load balancing logic 111 may generate respective indicators (indicating productions environments capabilities) so as to populate the routing dataset. In this way, a 'blacklist' of production environments incapable of performing the service may be built up.

An indicator may therefore be considered to be data or information identifying that a particular production environment is incapable of performing a particular service. That is to say, the indicator is service capability data indicating the capability of a production environment to perform a service. By way of example, a first indicator may indicate that a first production environment is incapable of performing a first service. A second indicator by indicate that a second production environment is incapable of performing a first service. A third indicator may indicate that the first production environment is incapable of performing a second service, and so on.

The routing dataset populating arrangement may be adapted to store additional data alongside or together with the indicator. That is to say, the routing dataset populating arrangement stores service capability data including at least the indicator. Other such data that may be stored includes, for example, a timestamp (of when the indicator is stored) or an identification of response time of the respective production environment. Other possible data that may be stored will be readily apparent to the person skilled in the art.

Put yet another way, in response to the first production environment 151 indicating that it is incapable of performing the requested service, the load balancing logic is adapted to generate a flag, which is stored in the routing dataset. The flag may be indicative that the first production environment is incapable of performing the previously requested service.

It may alternatively be considered that, in response to the first production environment 151 indicating that it is incapable of performing the requested service, the load balancing logic is adapted to generate an entry for a routing dataset, the entry indicating that the first production environment is incapable of performing the service. Such a routing dataset may be a routing table comprising at least one entry, each entry indicating one or more services that a particular production environment is incapable of performing.

For future requests to perform the same service, the load balancing logic 111 may consult or refer to the routing dataset (stored in the memory system 112), identify that the first production environment 151 is incapable of performing the service, and thereby determine to not request the first production environment to perform the service. Rather, the load balancing logic 111 may instead request that the second production environment 152 or the third production environment 153 perform the service.

In optional embodiments, in the event the first production environment does not indicate 222 that the first production environment is incapable of performing the service, the load balancing logic 111 is adapted to generate 235 service capability data comprising an indicator indicating that the first production environment 151 is capable of performing the desired service. Preferably, this generated service capability data is stored 245 in the routing dataset.

In some such embodiments, the first production environment 151 may be adapted to provide acknowledgement that it is capable of performing the service (i.e., actively respond). In other embodiments, the load balancing logic 111 may be adapted to infer that the first production environment 151 is capable of performing the service. By way of example, capability may be inferred when a predetermined period of time has elapsed without the first production environment indicating that it is incapable of performing the service.

It will be apparent that in some embodiments, the production environment(s) 151 is adapted to provide a response to the load balancing system 100 in response to the production environment requester 120 requesting the production environment 151 to perform a service. This may be in the form of an error or status code, such as the known and standardized Hypertext Transfer Protocol (HTTP) response status codes.

A distinction should be made between a production environment 'incapable' of performing a particular service, and a production environment 'unavailable' to perform the particular service.

A production environment which is incapable of performing a service is one which may be available (i.e., not too busy), but does not have the ability to perform the service. Production environments that are requested to perform a service they are incapable of performing may, for example, return a known "404 Not Found" error code, or even a "410 Gone" error code.

A production environment which is unavailable to perform the particular service may be capable of performing the service (i.e., it is possible for the production environment to perform the service), but is too busy or otherwise occupied, or even not permitted to perform the service (for the load balancing system), such that it is (for the present) unable to perform the service. Production environments that are requested to perform a service they are otherwise unavailable to perform may, by way of example only, return a known "403 Forbidden" error code, a "400 Internal Server Error" error code, or a "503 Service Unavailable" error code.

A production environment that is requested to perform a service, and is available and capable of performing the service, may respond with an acknowledgement or confirmation. By way of example, such a production environment may respond with a '200 OK' or '202 Accepted' status code.

The above described concept permits the load balancing system to dynamically learn where services are available, without the need for a pre-cached or pre-stored knowledge of the service availability. In other words, a routing dataset may be automatically populated without, say, user input. Furthermore, use of the proposed concept minimizes the overhead of the overall computing network, as the load balancing system need not explicitly or actively request service capability data from each production environment (i.e., there is no need to ask the production environments which services they are able to perform), rather this information is acquired passively. In yet another advantage, it is recognized that no change to the load balancing system (for instance, to the routing dataset) needs to be made should additional production environments or new services be added to the production environment arrangement 150.

In one or more embodiments, indicators are removed from the routing dataset after a predetermined period of time. That is to say, when a particular indicator has been stored by the routing dataset for a predetermined period of time (for instance, no less than one hour, for example, no less than two hours, no less than three hours and the like), the routing dataset population arrangement 110 is adapted to remove the indicator from the routing dataset. Thus, the routing dataset population arrangement 110 may be adapted to determine a length of time since an indicator was placed on the routing dataset, and delete the indicator when the detected length of time reaches or is greater than a predetermined value. Put yet another way, each indicator stored in the routing dataset has a limited time of life.

Put another way, information identifying a production environment's incapability to perform an action may be stored in the routing dataset (e.g. in response to the production environment indicating that it is incapable of performing a particular service). Such information may be removed, deleted or marked for deletion when a predetermined period of time has elapsed after such information has been stored. In this way, the load balancing system may subsequently request a production environment, previously identified as being unable to perform a particular service, to perform the same service.

Put yet another way, a portion of the service capability data of the dataset (comprising an indicator) may be removed or invalidated in response to a predetermined period of time elapsing after storage of service capability data comprising the indicator. Thus, it may be considered that an entry in the routing dataset (comprising an indicator indicating that a production environment is incapable of performing a service) is removed, invalidated, deleted, overwritten or marked for deletion when/after a predetermined period of time has elapsed after the entry was stored in the routing database.

Removal of such service capability data (comprising indicators) after a predetermined period of time may be performed, for example, by flagging the service capability data as expired, by overwriting the service capability (e.g., with blank or pseudorandom data), by archiving the data (e.g. in a service log) and so on. Other methods of removing entries of a routing dataset, portions of the service capability data and/or indicators will be readily apparent to the person skilled in the art.

In this way, if a service is deployed to an additional environment (i.e., a production environment becomes capable of performing a service), this will be quickly and automatically identified by the routing dataset population arrangement. Thus, the infrastructure of the load balancing system may be unchanged in the event additional production environments become capable of performing the service.

In some embodiments, the predetermined period of time may be the same for each indicator (or information). In particular embodiments, an indicator may be removed no more than an hour after it has been stored in the routing dataset. In other embodiments, an indicator may be removed no more than 30 minutes after it has been stored, for example, no more than 15 minutes after it has been stored.

In certain embodiments, the predetermined period of time may, for example, be dependent upon the service associated with the indicator. By way of example, consider a scenario in which the routing dataset stores a first indicator indicating that the first production environment is incapable of performing a first service, and a second indicator indicating that the first production environment is incapable of performing a second service. The first indicator may be removed after a first period of time has elapsed (after the first indicator is stored) and the second indicator may be removed after a second period of time has elapsed (after the second indicator is stored). The first and second periods of time may be different. The first and second periods of time may be determined based on the associated first and second service, respectively.

In one scenario, in response to the first production environment 151 indicating that it is unable to perform a requested service, the load balancing logic 111 may generate service capability data. The service capability data may include both an indicator indicating that the first production environment is incapable of performing the requested service and a timestamp indicating a time at which the load balancing logic generated the service capability data. The load balancing logic 111 may be further adapted to determine a difference between a current time and such a timestamp, and delete, flag, invalidate or remove a portion of the service capability data (including at least the indicator) when the difference is more than a predetermined period of time. Other methods of determining a length of time for which service capability data has been stored will be readily apparent to the person skilled in the art.

Of course, it will also be apparent to a person skilled in the art that service capability data may alternatively or additionally be removed by a user or administrator of the system, or in response to a production environment indicating that it is now capable of performing the service.

Figure 3:
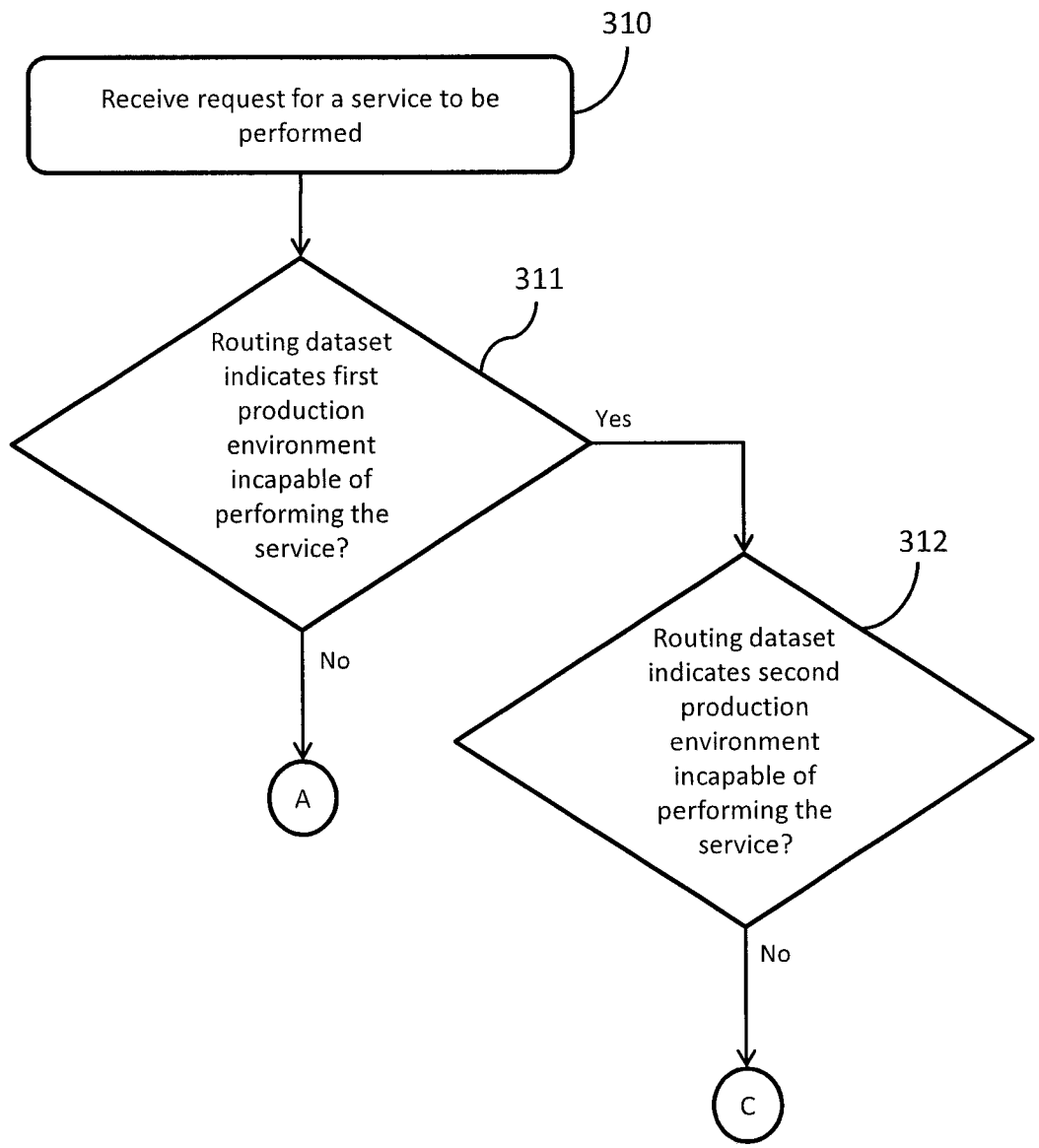
FIGS. 3-5 depict optional steps for a method of populating a routing dataset, in accordance with one or more aspects of the present invention.

With reference now to FIGS. 1-3, in at least one embodiment, the load balancing logic 111, and thereby the routing dataset population arrangement 110, may be further adapted to receive 310 a request for a service to be performed. This request may, for example, be generated by a computer or processing arrangement external to the load balancing system 100.

In some embodiments, the load balancing logic may be adapted to determine 311 if the routing dataset comprises an indicator indicating that the first production environment 151 is incapable of performing the service.

In response to the routing dataset not comprising an indicator indicating that the first production environment 151 is incapable of performing the service, the load balancing logic is adapted to request 210 the first production environment 151 to perform the service.

In response to routing dataset comprising an indicator indicating that the first production environment 151 is incapable of performing a service, the load balancing logic is adapted to determine 312 if the routing dataset comprises an indicator indicating that the second production environment 152 is incapable of performing the service.

Figure 4:
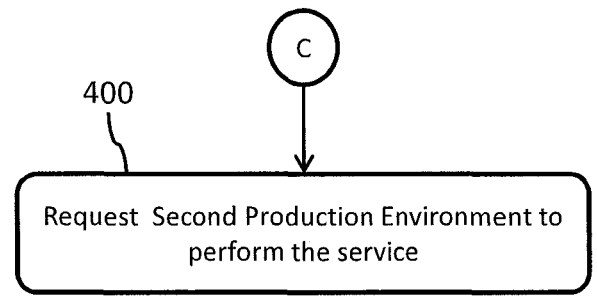
Figure 5:
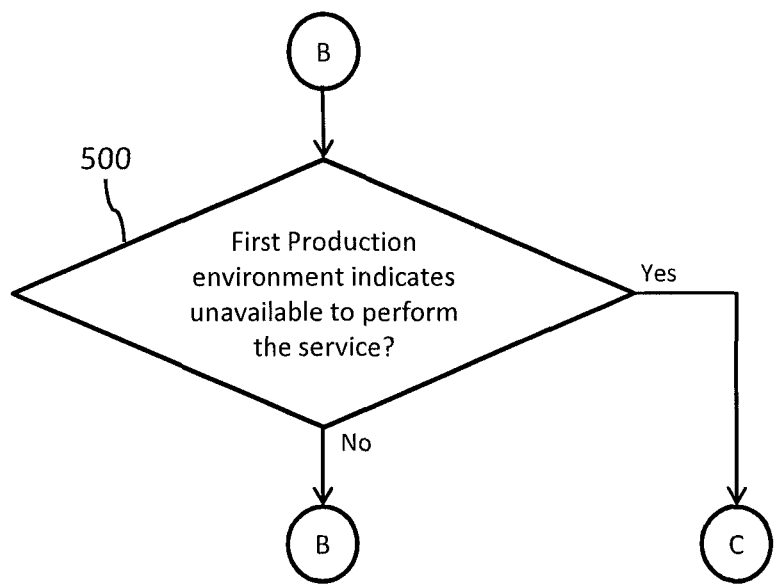

In one or more embodiments, and with reference to FIGS. 1, 2 & 4, in response to the routing dataset not comprising an indicator indicating that the second production environment is incapable of performing the service, the load balancing logic 111 is further adapted to request 400 the second production environment to perform the service.

In further examples, in response to the routing dataset comprising an indicator indicating that the second production environment 152 is incapable of performing the service, the load balancing logic 111, and thereby the routing dataset population arrangement 110, may be adapted to determine whether the third production environment 153 is incapable of performing the service. This iteration of determining whether production environments are capable of performing the service may be repeated until the load balancing logic 111 has determined that no production environment is capable of performing the service or until the load balancing logic 111 identifies a production environment capable of performing a service.

With continued reference to FIGS. 1, 2 & 4, in one or more embodiments, the load balancing logic may be adapted to request 400 the second production environment to perform the service if the first production environment indicates 221, in response to a request 210 to perform the service, that it is incapable of performing the requested service. That is to say, if the load balancing logic 111 requests 210 the first production environment to perform a service (e.g., when there is no indicator in the routing dataset indicating that the first production environment is incapable of performing the service), and the first production environment indicates 221 that it is incapable of performing the service, the load balancing logic 111 may request 400 the second production environment to perform the service.

If the second production environment also indicates that it is incapable of performing the service, a third production environment is requested to perform the service. It will be apparent that any number of production environments may be requested in this manner. In one or more implementations, the load balancing logic 111 generates 230 service capability data comprising a respective indicator each time a production environment indicates 221 that it is incapable of performing the service, and stores 240 service capability data comprising such an indicator in the routing dataset.

In this way, a 'blacklist' of production environments incapable of performing a service may be built up by the load balancing logic. That is to say, a routing dataset or routing table may be populated by service capability data comprising indicators indicating or identifying which services particular production environments are incapable of performing. In at least one embodiment, for subsequent requests to perform a service, the load balancing system 100 will not request the blacklisted or otherwise flagged production environment(s) to perform the service.

In one or more embodiments, the load balancing logic may be adapted to remove, delete, invalidate, overwrite or otherwise mark for deletion a blacklisted production environment from the 'blacklist' in response to a predetermined period of time elapsing after the production environment is placed on the blacklist. In other words, blacklisted production environments only have a short time of life on the blacklist. This predetermined period of time may, for example, be no more than one hour, for example, no more than half an hour.

With further reference now to FIGS. 1-3 & 5, in at least one embodiment, the load balancing logic 111 is adapted to determine 500 whether the first production environment indicates that it is unavailable (to perform the service). This step may be taken, for example, after it is determined 311 that the routing dataset does not comprise an indicator indicating that the first production environment is incapable of performing the service, or after the first production environment indicates 222 that it is capable of performing the service.

In response to the first production environment 151 indicating that it is unavailable to perform the service, the load balancing logic 111 is adapted to request 400 the second production environment 152 to perform the service.

In one or more embodiments, in response to the first production environment 151 indicating that it is unavailable, the load balancing logic 111 does not generate service capability data. This is because the production environment(s) may only be adapted to respond with a single status code (e.g. indicating that the production environment is too busy to process the request), and it may not be clear whether the first production environment is capable or not of performing the service.

In another or further embodiment, the load balancing logic 111 is adapted to, in response to the first production environment 151 indicating that it is available, generate 235 service capability data comprising an indicator indicating that the first production environment is capable of performing the service. In other words, if the first production environment indicates that it can perform the service, relevant service capability data is generated.

In some embodiments, each production environment 151, 152, 153 is a web or HTTP server adapted to host a plurality of files or collections of data, each associated with a respective URL (i.e. services). The load balancing system 100 is adapted to receive a request for a service 190 (i.e. a user requests access to files associated with a specified URL), and determine which server is to perform the service (i.e., provide files/data associated with the relevant URL to the user). Such a request may include a URL path, which, as is known in the art, may be parsed to identify an appropriate URL and its associated files/data. It will be apparent that not every HTTP server (i.e., production environment) may have data associated with every possible or allowable URL, such that only a select number of HTTP servers (production environments) may provide the service. This of particular importance when a new website is being 'rolled out', so that files available to only a select group of HTTP servers.

The concept of the load balancing logic 111 above described is particularly advantageous to such embodiments, as it allows a fast and dynamic routing logic, with minimal overhead, thereby allowing an improved speed of web access to enhance a user's experience.

Referring back to FIG. 1, the computing network may further comprise backend services 170. The backend services are adapted to provide, for example, additional functionality to the computing network such as cloud storage, social network integration and so on. Such backend services 170 will be readily apparent to the person skilled in the art.

According to an aspect of the invention, and as depicted in FIG. 2, there is provided a computer-implemented method of populating a routing dataset for a load balancing system with service capability date. The method comprises requesting 210 a first production environment to perform the service. The method also comprises, in response to the first production environment indicating 221 that it is incapable of performing the requested service, generating 230 service capability data comprising a first indicator, the first indicator indicating that the first production environment is incapable of performing the requested service and storing 240 the service capability data in the routing dataset so as to populate the routing dataset with at least the first indicator.

Further embodiments of the method may be elucidated with reference to the preceding description and with particular reference to FIGS. 2-5.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of populating a routing dataset for a load balancing system with service capability data, the method comprising:
    requesting a production environment to perform a service, the requesting comprising sending a request to the production environment;
    based on the production environment indicating, by providing an indication in response to the request, that the production environment is incapable of performing the service:
        generating service capability data comprising a first indicator, the first indicator indicating that the production environment is incapable of performing the service to be performed; and
        storing the service capability data comprising the first indicator in the routing dataset so as to populate the routing dataset with at least the first indicator; and
    based on a predetermined period of time elapsing after storing the service capability data comprising the first indicator in the routing dataset, removing a portion of the service capability data from the routing dataset, the portion comprising at least the first indicator.

2. The computer-implemented method of claim 1, further comprising receiving an initial request for the service to be performed.

3. The computer implemented method of claim 1, wherein the production environment is a first production environment, and wherein the method further comprises:
    based on the first production environment indicating that the first production environment is incapable of performing the service, requesting a second production environment to perform the service.

4. The computer-implemented method of claim 3, further comprising:
    based on the second production environment indicating that the second production environment is incapable of performing the service to be performed:
        generating service capability data comprising a second indicator, the second indicator indicating that the second production environment is incapable of performing the service to be performed; and storing the service capability data comprising the second indicator in the routing dataset so as to populate the routing dataset with at least the second indicator.

5. The computer implemented method of claim 1, further comprising:
   determining if the routing dataset is storing a first indicator indicating that the production environment is incapable of performing the service to be performed; and
   based on the routing dataset storing the first indicator, requesting another production environment to perform the service.

6. The computer-implemented method of claim 1, further comprising, based on the production environment indicating that the production environment is too busy to perform the service, requesting another production environment to perform the service.

7. The computer-implemented method of claim 1, further comprising:
   receiving a further request for the service to be performed;
   determining if a routing dataset is storing the first indicator indicating that the production environment is incapable of performing the service to be performed; and
   based on the routing dataset storing the first indicator, requesting another production environment to perform the service.

8. A computer program product for generating service capability data for populating a routing dataset for a load balancing system, the computer program product comprising:
   a computer readable storage medium having program instructions embodied therewith, the program instructions executable by a processing unit to cause the processing unit to perform a method comprising:
      requesting a production environment to perform a service, the requesting comprising sending a request to the production environment;
      based on the production environment indicating, by providing an indication in response to the request, that the production environment is incapable of performing the service:
         generating service capability data comprising a first indicator, the first indicator indicating that the production environment is incapable of performing the service to be performed; and
         storing the service capability data comprising the first indicator in the routing dataset so as to populate the routing dataset with at least the first indicator; and
      based on a predetermined period of time elapsing after storing the service capability data comprising the first indicator in the routing dataset, removing a portion of the service capability data from the routing dataset, the portion comprising at least the first indicator.

9. The computer program product of claim 8, further comprising receiving an initial request for the service to be performed.

10. The computer program product of claim 8, wherein the production environment is a first production environment, and wherein the method further comprises:
   based on the first production environment indicating that the first production environment is incapable of performing the service, requesting a second production environment to perform the service.

11. The computer program product of claim 10, further comprising:
   based on the second production environment indicating that the second production environment is incapable of performing the service to be performed:
      generating service capability data comprising a second indicator, the second indicator indicating that the second production environment is incapable of performing the service to be performed; and
      storing the service capability data comprising the second indicator in the routing dataset so as to populate the routing dataset with at least the second indicator.

12. The computer program product of claim 8, further comprising:
   determining if the routing dataset is storing a first indicator indicating that the production environment is incapable of performing the service to be performed; and
   based on the routing dataset storing the first indicator, requesting another production environment to perform the service.

13. The computer program product of claim 8, further comprising, based on the production environment indicating that the production environment is too busy to perform the service, requesting another production environment to perform the service.

14. The computer program product of claim 8, further comprising:
   receiving a further request for the service to be performed;
   determining if a routing dataset is storing the first indicator indicating that the production environment is incapable of performing the service to be performed; and
   based on the routing dataset storing the first indicator, requesting another production environment to perform the service.

15. A system for generating service capability data for populating the routing dataset for a load balancing system, the system comprising:
   a memory; and
   a processor communicatively coupled to the memory, wherein the system is configured to perform a method comprising:
      requesting a production environment to perform a service, the requesting comprising sending a request to the production environment;
      based on the production environment indicating, by providing an indication in response to the request, that the production environment is incapable of performing the service:
         generating service capability data comprising a first indicator, the first indicator indicating that the production environment is incapable of performing the service to be performed; and
         storing the service capability data comprising the first indicator in the routing dataset so as to populate the routing dataset with at least the first indicator; and
      based on a predetermined period of time elapsing after storing the service capability data comprising the first indicator in the routing dataset, removing a portion of the service capability data from the routing dataset, the portion comprising at least the first indicator.

16. The system of claim 15, further comprising receiving an initial request for the service to be performed.

17. The system of claim 15, wherein the production environment is a first production environment, and wherein the method further comprises:
  based on the first production environment indicating that the first production environment is incapable of performing the service, requesting a second production environment to perform the service.

* * * * *